United States Patent [19]

Bergling

[11] 4,015,702
[45] Apr. 5, 1977

[54] METHOD AND APPARATUS FOR CONVEYING METAL PLATES

[75] Inventor: Charles Gunnar Birger Bergling, Kungalv, Sweden

[73] Assignee: Esab-Hebe AB, Hallsberg, Sweden

[22] Filed: July 2, 1975

[21] Appl. No.: 592,674

[30] Foreign Application Priority Data

July 8, 1974 Sweden .............................. 7408980

[52] U.S. Cl. .............................. 198/486; 198/147; 214/1 BB; 214/1.1; 83/153; 83/206; 144/245 R; 271/268

[51] Int. Cl.² ........................................ B65G 25/04

[58] Field of Search ............. 198/19, 20, 110, 218, 198/29, 30, 221, 222, 485, 486, 736, 738, 747; 214/1 F, 1 S, 1 SW, 1 BB, 1 D, 1.1, 1.7, 1.4, 1.6; 83/153, 277, 409, 206, 425, 435.1; 269/61; 271/233, 268, 269; 144/245 R, 245 B

[56] References Cited

UNITED STATES PATENTS

| | | | |
|---|---|---|---|
| 978,551 | 12/1910 | Bray | 271/269 |
| 1,883,890 | 10/1932 | Farley | 198/30 |
| 2,622,745 | 12/1952 | Roe | 214/1 F |
| 2,956,666 | 10/1960 | Krynytzky | 198/29 |
| 3,286,744 | 11/1966 | Stall et al. | 83/409 |
| 3,542,359 | 11/1970 | Pilitz | 271/269 |

Primary Examiner—Evon C. Blunk
Assistant Examiner—Joseph E. Valenza
Attorney, Agent, or Firm—Burns, Doane, Swecker & Mathis

[57] ABSTRACT

Method and apparatus for successively conveying large metal plates of different sizes to a particular position where an operation such as welding a reinforcing element thereto can be performed. The plates of different sizes may be gripped at points on the front and rear ends in line of their movement with one side edge engaged by guide rollers on a side of the conveyor track, and the distance between the line of gripping points and the edge of the apparatus is so determined as to permit conveyance of plates of a range of different sizes to be conveyed to the desired position without misplacement due to twisting.

3 Claims, 4 Drawing Figures

METHOD AND APPARATUS FOR CONVEYING METAL PLATES

The invention relates to a method and conveyor for successive transport of a plurality of large sheet-metal plates of different sizes. The invention particularly relates to transport of very large plates for ship building in which the transport is aimed at successively bringing the plates of different sizes into the correct position for reinforcing elements to be secured to them.

It is known to use a conveyor system for the successive transport of different sizes of large ships plates, wherein the plates are gripped along one side edge. This causes considerable torque during starting and stopping and the plates are thus twisted from the desired position. To prevent the reinforcing elements from being misplaced on the plates, time must be spent in aligning them. The torque can be eliminated by gripping the plates on the front and rear edges in such a way that a line between the gripping points intersects the center of gravity of the plate. However, plates of different sizes are used for ship building and to eliminate the torque in this way it would be necessary to position each plate with respect to the conveyor system, which is a complicated procedure with heavy plates.

According to the invention it has been found that a satisfactory reduction of the torque can be achieved during the starting and stopping operations with the plates each having one side edge at the same position of the conveyor system. With the method according to the invention, therefore, the plates are transported with one of their sides coinciding with a line which is the same for all the plates. The method is characterized in that during transport the plates are held at one gripping point on the front edge and one gripping point on the rear edge, these gripping points lying at constant distance from said line which is 40–48 percent of the width of the largest plate transported on the conveyor system. It is preferred that said constant distance is such that $$0.8\, m_2 a_2 < m_1 a_1 < 1.2\, m_2 a_2$$

in which $m_1$ and $m_2$ represent the mass of the largest and smallest plate, respectively, which is being moved by the method, and $a_1$ and $a_2$ represent the distance between the centers of gravity of the largest and smallest plate, respectively, and a straight line joining the two gripping points, said straght line passing between the centers of gravity of the largest and smallest plates.

The invention is based on the circumstance that, when securing reinforcing elements on ships plates, it has been found practical in one and the same machine to deal only with plates which do not differ too greatly in size. The width of the smallest plate should not be much less than half the width of the largest plate. If smaller plates are to be handled, this should preferably be done in another machine. When building a ship where the greatest plate width is 25 m, it has been found that the smallest plate width is generally 10 – 15 m.

The invention also relates to a conveyor for successive transport of large sheet-metal plates of different sizes. The conveyor comprises a horizontal conveyor track having a plurality of wheels to support the plates during their transport, rollers along one side of the conveyor track to fix the position of one side edge of the plates, and also a conveyor system arranged in the conveyor track for successive transport of the plates, the conveyor system being provided with gripping devices to grip the plates at a gripping point on the front edge and a gripping point on the rear edge, and is characterized in that the conveyor system is located at a distance of 40 – 48% of the width of the conveyor track from the side of the track defined by the rollers. The location of the conveyor system in this means is dictated by two factors; first that the width of the smallest plate is not less than half the width of the largest plate and second, that utilizing the above-described relationship $$0.8\, m_2 a_2 < m_1 a_1 < 1.2\, m_2 a_2$$

has been found to define within definite limits characteristics of the method and system that provide the described results.

It is accordingly an object of the invention to provide a novel method for successively conveying metal plates of different sizes to a particular position with a minumum expenditure of time and effort to accommodate for the different sizes.

Another object is to provide novel apparatus that can be used for conveying metal plates of different sizes to a predetermined position with a minimum expenditure of time and effort to accommodate for the different sizes.

These and other objects of the present invention will be apparent from the claims and from the following detailed description when read in conjunction with the appended drawing, in which:

Figure 1:
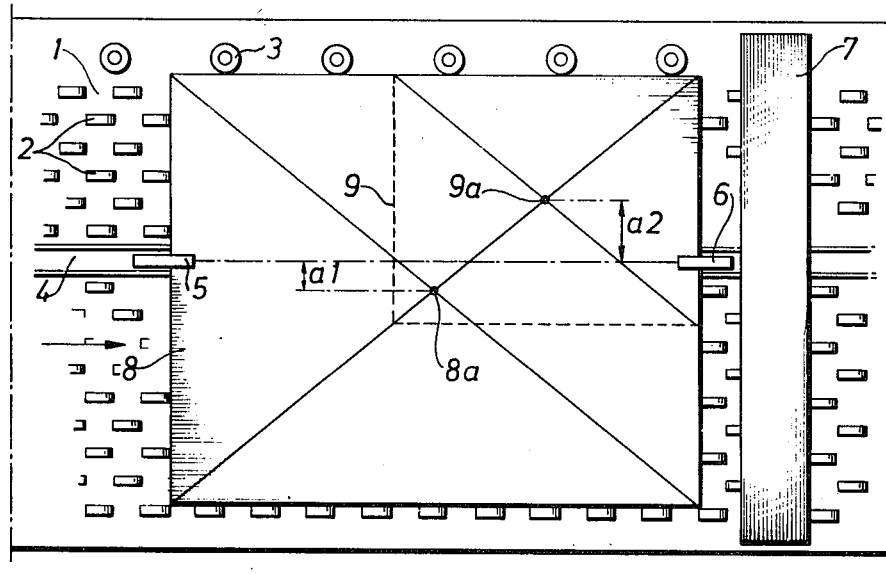
FIG. 1 shows a plan or top view of a machine constructed in accordance with the invention.

The machine according to FIG. 1 comprises a horizontal conveyor track 1 having a plurality of wheels 2 on which plates can be fed forward in the longitudinal direction of the conveyor track. Along the lefthand edge of the conveyor track are rollers 3 with vertical axes. In the track is a conveyor system 4 comprising gripping devices 5, 6 which grip the plates at their front and rear edges. A welding machine 7 is arranged above the conveyor track for welding reinforcing elements on to the plates. The welding machine itself is not a feature of the invention and will not therefore be further described.

FIG. 1 shows in unbroken lines a plate 8 representing the largest plate to be handled in the machine for building ships, and in broken lines a plate 9 representing the smallest plate to be handled in the machine. The plates are fed forward with their lefthand edges close to the rollers 3. The center of gravity of the largest plate is located at 8a and the center of gravity of the smallest plate at 9a. The conveyor system 4 is located in such a position between the centers of gravity 8a, 9a, that, for the range of plate sizes to be handled, $0.8 m_2 a_2 < m_1 a_1 < 1.2 m_2 a_2$, where $m_1$ and $m_2$ represent the mass of the largest and smallest plates, respectively, and $a_1$ and $a_2$ represent the distance between the conveyor system and the centers of gravity of the largest and smallest plates, respectively.

Figure 2:
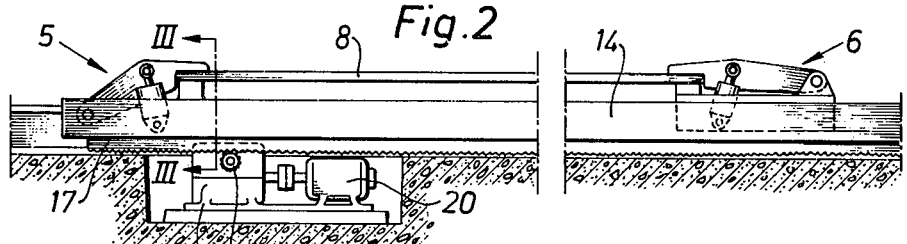
FIG. 2 shows a longitudinal partial section of the conveyor system in the machine according to FIG. 1.
Figure 3:
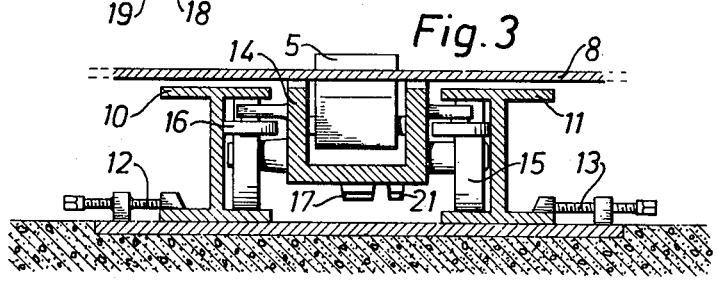
FIG. 3 shows a section along the line III—III in FIG. 2.

The conveyor system 4 is shown in more detail in FIGS. 2 and 3. Two parallel beams 10, 11 are arranged on the factory floor and can be adjusted laterally by means of adjustment screws 12, 13. The beams carry a longitudinally extending guide beam 14 having U-shaped cross section. The guide beam 14 is provided with a number of wheels 15 running on the lower flanges of the beams 10, 11 and a number of wheels 16 abutting the rib of the beams 10, 11. The two gripping devices 5, 6, mentioned in connection with FIG. 1 are arranged in the guide beam 14, each consisting of two jaws which, by means of a hydraulic device, can be brought to grip the edge of the plate 8. The gripping device 5 can be moved along the guide beam 14 and secured in any desired position, depending on the length of the plate. The gripping device 6 is fixed in the longitudinal direction but is laterally movable. Due to this movability in lateral direction the plate is absolutely parallel with the welding machine 7.

The longitudinal and lateral adjustments of the gripping devices 5 and 6, respectively, may be provided by any of many means which will be apparent to one skilled in the art. Thus, the device 5 with its hydraulic operator may be mounted on a separate base adjustable to selected positions along the beam 14 at which it may be secured by set or adjustment screws passing through the sides of beam. The device 6 may likewise be mounted on a base member adjustable in lateral position within the beam 14 by set or adjustment screws extending through the beam sides.

A rack 17 is arranged on the lower side of the guide beam 14, the rack being in engagement with a toothed wheel 18 which, via a toothed gear 19, is driven by a motor 20. The motor and gear are located in a well in the workshop floor. The motor 20 is preferably a hydraulic motor. If desired two or more toothed wheels 18 may be placed one after the other and driven by separate motors. A second rack 21 is also arranged on the lower side of the guide beam 14, this rack driving an electric pulse counter, not shown, which controls the driving motor 20 of the conveyor system. Each pulse corresponds to a predetermined length of forward feed by a conveyor system. A desired number of pulses, adjustable to correspond to a desired amount of forward feeding, can be arranged to operate a pulse counter not shown. When the counter has recorded this number of pulses, it emits a signal to the driving motor 20 which stops the conveyor system. When a reinforcing element has been welded on in the welding machine 7, transport of the next plate can take place.

When the conveyor system 4 in the position discussed in connection with FIG. 1, the maximum torque occurring for a series of plates of different sizes is reduced to minimum. The torque that occurs will be greatest during starting and stopping of the conveyor system and that condition is a limiting factor as to the range of plate sizes that can be satisfactorily handled.

Figure 4:
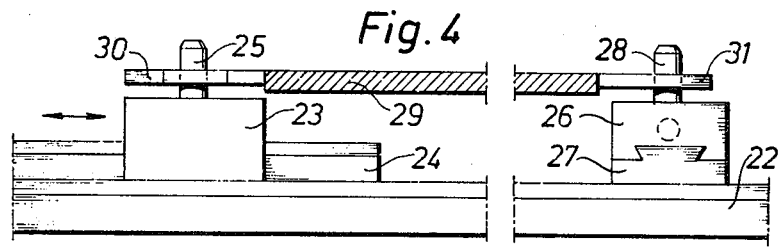
FIG. 4 shows a side view of an alternative arrangement for retaining the plates on the conveyor system.

FIG. 4 shows an alternative arrangement for securing the plates on the conveyor system. Here a guide means 22 is provided with a first pin mounting device 23 which is movable in the longitudinal direction on a rail 24. A second pin mounting device 26 is adjustable in a lateral direction on a rail 27. Both pin mounting devices can be secured in the desired positions on the rails by any suitable means, as by set screws, extending through the devices to the respective rails. The pin mounting devices are provided with vertical pins 25, 28, which fit into metal washers 30, 31, provided with holes. These washers are welded to the rear and front edges of a plate 29 to be transported. It will be apparent that the rail-type adjustable mounting means for the pin mounting device in this embodiment can also be adapted to provide the adjustment for the gripping devices 5 and 6.

The present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

EXAMPLE 1

A conveyor was designed for handling steel plates having a largest width of 11.7 m and a smallest width of 7.0 m. The largest length of the plates was 11.7 m, and the smallest length was 6.0 m. The thickness of the plates varied from 8 to 25 mm. The mass of this plate was 8.100 kg.

It was decided to place the conveyor drive means at a distance of 5.35 m from the side of the conveyor track defined by the guide means. This is 45.7 percent of the width of the conveyor track.

EXAMPLE 2

A conveyor was designed for handling steel plates having a largest width of 18 m and a smallest width of 10 m. The largest length of the plates was 18 m. The smallest length was not specified.

Therefore, in calculating the torque the value of the largest length was used. The thickness of the plates was 35 mm. The mass of the largest plate was 87.100 kg. The mass of the plate having the smallest width was 48.500 kg.

It was decided to place the conveyor drive means at a distance of 7.5 m (41.7 percent from the side of the conveyor track defined by the guide means. Consequently, the distance $a_1$ was 1.5 m, and the distance $a_2$ was 2.5 m. The value of $m_1 a_1$ was 131.000, and the value of $m_2 a_2$ was 121.000. These values satisfied the relationship given in claim 2.

EXAMPLE 3

A conveyor was designed for handling steel plates having a largest width of 25 m and a smallest width of 12 m. The largest length of the plates was 30 m, and the smallest length was 10 m. The thickness of most of the plates varied between 10 and 40 mm. The largest plate had a thickness of 30 mm. A special type of plate, however, had a width of 16 m, a length of 20 m, and a thickness of 40 mm. The mass of said largest plate was 173.000 kg, and the mass of the said special type of plate was 98.500 kg.

In order to obtain minimum torque during starting and stopping it was decided to place the conveyor drive means at a distance of 11 m (44 percent from the side of the conveyor track defined by the guide means.

What is claimed is:

1. A conveyor for transporting large plates of a predetermined range of different sizes comprising a substantially horizontal conveyor track including means for supporting a plate free for longitudinal movement thereon, guide means extending longitudinally along a side of said track for guidingly engaging an edge of a plate to be transported, conveyor drive means including means for gripping each of the front and rear ends of a plate to be transported at points in a line parallel to said guide means, the means for gripping the plate being spaced from said guide means by from 40 to 48 percent of the width of said conveyor track.

2. A conveyor as defined in claim 1, wherein the line through the means for gripping a plate to be transported is spaced from said guide means by an amount determined by the relationship $0.8 m_2 a_2 < m_1 a_1 < 1.2 m_2 a_2$, wherein $m_1$ and $m_2$ represent the masses of the largest and smallest plates in said predetermined range, respectively, and $a_1$ and $a_2$ represent the distance between the centers of gravity of the largest and smallest plates of said predetermined range, respectively, and the line through the means for gripping a plate, said line through the means for gripping the plate passing between the centers of gravity of the largest and smallest plates.

3. A conveyor as defined in claim 1, wherein said conveyor drive means includes means for varying the longitudinal spacing between the means for gripping the front and rear ends of a plate.

* * * * *